(12) United States Patent
Rimon

(10) Patent No.: US 8,296,422 B2
(45) Date of Patent: Oct. 23, 2012

(54) METHOD AND SYSTEM OF MANIPULATING DATA BASED ON USER-FEEDBACK

(75) Inventor: Noam Rimon, Redwood City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 169 days.

(21) Appl. No.: 12/775,075

(22) Filed: May 6, 2010

(65) Prior Publication Data

US 2011/0276680 A1    Nov. 10, 2011

(51) Int. Cl.
G06F 15/173    (2006.01)
G06F 15/16    (2006.01)

(52) U.S. Cl. .................................. 709/224; 709/219

(58) Field of Classification Search .............. 709/224, 709/219
See application file for complete search history.

(56) References Cited

U.S. PATENT DOCUMENTS

| | | | |
|---|---|---|---|
| 4,787,051 A | 11/1988 | Olson | |
| 4,843,568 A | 6/1989 | Krueger | |
| 5,128,671 A | 7/1992 | Thomas, Jr. | |
| 5,528,265 A | 6/1996 | Harrison | |
| 6,157,368 A | 12/2000 | Fager | |
| 6,375,572 B1 | 4/2002 | Masuyama | |
| 6,587,127 B1 * | 7/2003 | Leeke et al. | 715/765 |
| 6,640,336 B1 | 10/2003 | Ebisawa | |
| 7,469,345 B2 | 12/2008 | Shimada et al. | |
| 7,518,503 B2 | 4/2009 | Peele | |
| 7,783,249 B2 * | 8/2010 | Robinson | 455/3.06 |
| 8,037,011 B2 * | 10/2011 | Gadanho et al. | 706/62 |
| 2002/0085097 A1 | 7/2002 | Colmenarez et al. | |
| 2004/0025180 A1 * | 2/2004 | Begeja et al. | 725/46 |
| 2004/0212589 A1 | 10/2004 | Hall et al. | |
| 2007/0244984 A1 * | 10/2007 | Svendsen | 709/217 |
| 2011/0107215 A1 * | 5/2011 | Klappert | 715/716 |

OTHER PUBLICATIONS

Pandora Internet Radio; 2005-2010 Pandora Media, Inc.; http://www.pandora.com/corporate/; pp. 1-2.
OnLive MicroConsole; http://www.onlive.com/service/how_onlive_works.html; 2009-2010 OnLive, Inc.; p. 1.
Bolt, R.A., "Put-that-there": voice and gesture at the graphics interface, Computer Graphics, vol. 14, No. 3 (ACM SIGGRAPH Conference Proceedings) Jul. 1980, pp. 262-270.
DeWitt, Thomas and Edelstein, Phil, "Pantomation: A System for Position Tracking," Proceedings of the $2^{nd}$ Symposium on Small Computers in the Arts, Oct. 1982, pp. 61-69.

* cited by examiner

*Primary Examiner* — Asghar Bilgrami
(74) *Attorney, Agent, or Firm* — Frommer Lawrence & Haug LLP; William S. Frommer; Paul A. Levy

(57) ABSTRACT

A method and system for providing content data to a user that includes providing a sample that is previewed by the user. The content data includes e-books, albums, games, videos and other electronic data. The user can then decide whether to accept the content based on the sample. If the sample is rejected, the user profile is updated to reflect the rejection. If the sample is accepted, the entire content is provided to the user. The amount of the content viewed or listened to by the user is tracked to determine how much of the content was actually listened to or viewed.

24 Claims, 12 Drawing Sheets

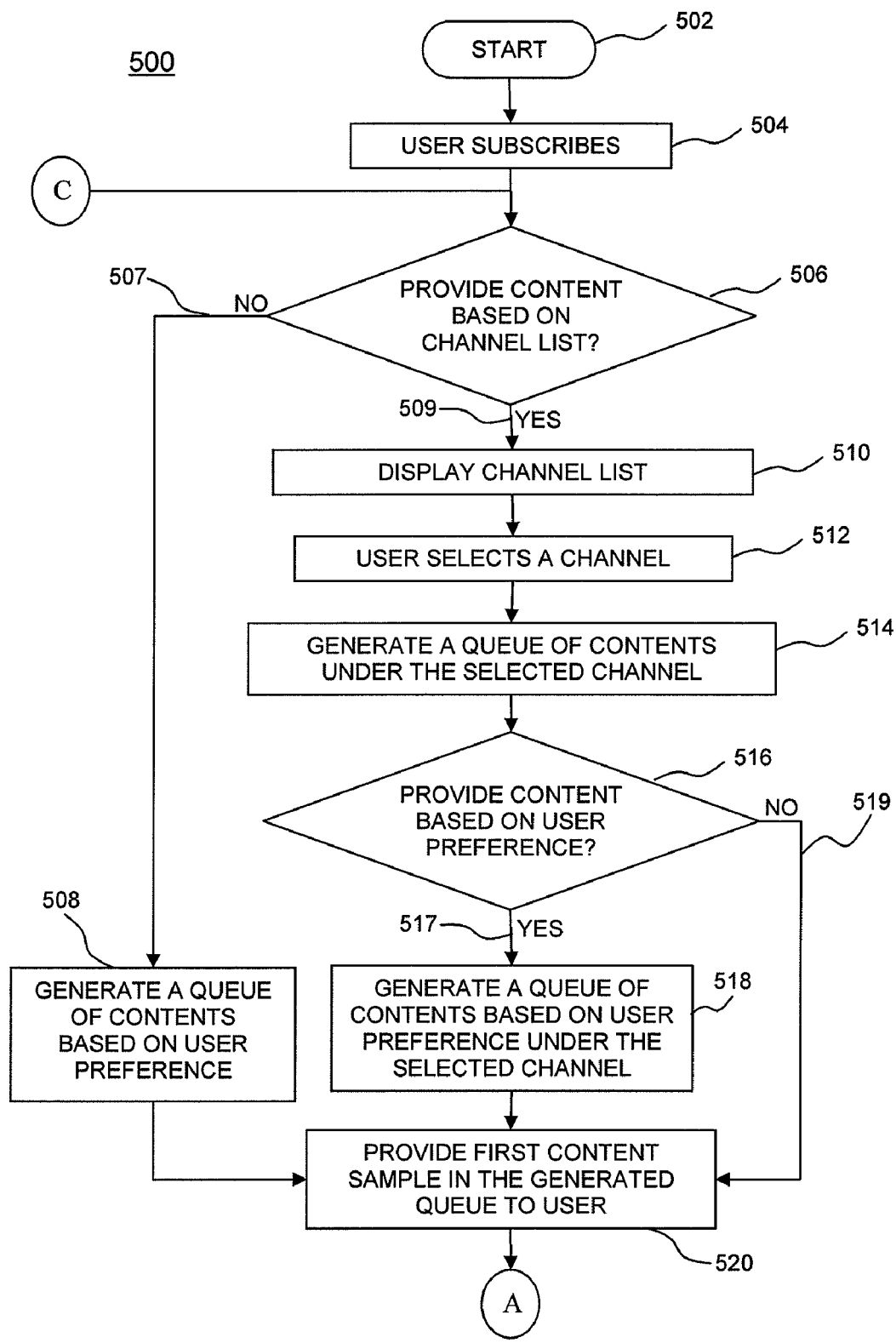

METHOD AND SYSTEM OF MANIPULATING DATA BASED ON USER-FEEDBACK

BACKGROUND

1. Field of the Invention

This invention relates generally to a method and system of manipulating data based on user feedback. More specifically, a user profile may be generated by the user feedback.

2. Background Discussion

Providing desired content, such as TV programs, on-line media and other electronic data to users, is less than optimum. Currently there are two primary methods for users to obtain new content, which include, for example: 1) purchasing a tangible media (DVD, BRD, Cartridge, etc) and, 2) downloading content from an online store.

SUMMARY

Embodiments of the present invention are directed to methods and apparatus for providing content on-demand, such as games, applications, audio data, video data, audio/video data, text data and other content to a user via a network.

One embodiment of the present invention is directed to a method of providing data to a user (the method). The method includes providing sample content to a user device, the sample content being a portion of content data. A response to the sample content by the user is identified. User profile data is generated based on the response to the sample content, and second sample content is provided to the user device based on the response to the sample content. The user profile data is updated based on the response. Additional content data is provided to the user device when the response indicates a positive indication, (indicates that a user at the user device desires the additional content data). The additional content is not provided to the user device when the response indicates a negative indication, (indicates that a user at the user device does not desire the additional content data). The response further indicates an elapsed time that the sample content was provided to the user prior to receiving the positive indication or the negative indication.

Another embodiment of the present invention is directed to the method of providing data described above in which the sample content comprises a preselected quantity of content.

Yet another embodiment of the present invention is directed to the method of providing data described above in which the sample content is provided to the user device based on a rating associated with the sample content.

Yet another embodiment of the present invention is directed to the method of providing data described above in which the rating is based on subject matter of the content.

Yet another embodiment of the present invention is directed to the method of providing data described above in which parameters of the sample content include electronic graphic data and transmission speed of the content.

Yet another embodiment of the present invention is directed to the method of providing data described above in which the electronic graphic data of the sample content is greater than an electronic graphic data threshold associated with the user profile.

Yet another embodiment of the present invention is directed to the method of providing data described above in which the electronic graphic data threshold is determined according to a rating associated with the sample content.

Yet another embodiment of the present invention is directed to the method of providing data described above in which the transmission speed of the sample content is greater than a transmission speed threshold associated with the user profile.

Yet another embodiment of the present invention is directed to the method of providing data described above in which the transmission speed threshold is determined according to a rating associated with the sample content.

Yet another embodiment of the present invention is directed to the method of providing data described above in which a fee is charged for the additional content data provided to the user based on the elapsed time indicated in the response.

Yet another embodiment of the present invention is directed to the method of providing data described above further comprises monitoring when the user terminates the sample content, and calculating a first time that the user spends using the sample content.

Yet another embodiment of the present invention is directed to the method of providing data described above further comprises monitoring when the user terminates the additional content data, and calculating a second time that the user spends using the additional content data.

Yet another embodiment of the present invention is directed to the method of providing data described above further comprises monitoring when the user stops the sample content, calculating a first time that the user spends using the sample content, monitoring when the user stops the additional content data; and calculating a second time that the user spends using the additional content data. The rating is modified based on the first time and the second time.

Yet another embodiment of the present invention is directed to the method of providing data described above further comprises setting a time limit to the elapsed time that the sample content was provided prior to receiving the positive indication or the negative indication from the user.

Yet another embodiment of the present invention is directed to the method of providing data described above further comprises deleting sample content when the number of the negative indications indicated by the response to the sample content exceeds a predetermined value.

Yet another embodiment of the present invention is directed to the method of providing data described above further comprises identifying different users using a particular user device.

Yet another embodiment of the present invention is directed to the method of providing data described above in which the sample content are provided to the user based on the user profile data, independently of user selecting operation.

Another embodiment of the present invention is directed to providing data to a user. The method includes generating user profile data. Sample content is provided to a user device based on the user profile data, the sample content is a portion of content data. A response to the provided sample content by a user is identified. The user profile data is updated based on the response to the provided sample content. The content data corresponding to the provided sample content is provided to the user device, when the response indicates a positive indication, which indicates that a user at the user device desires the content data corresponding to the provided sample content. Another sample content, which is a portion of another content data, is provided to the user device, when the response indicates a negative indication, which indicates that a user at the user device does not desire the content data corresponding to the provided sample content. The response further indicates an elapsed time that the sample content was provided to the user prior to receiving the positive indication or the negative indication.

BRIEF DESCRIPTION OF THE DRAWINGS

To the accomplishment of the foregoing and related ends, certain illustrative embodiments of the invention are described herein in connection with the following description and the annexed drawings. These embodiments are indicative, however, of but a few of the various ways in which the principles of the invention may be employed and the present invention is intended to include all such aspects and their equivalents. Other advantages, embodiments and novel features of the invention may become apparent from the following description of the invention when considered in conjunction with the drawings. The following description, given by way of example, but not intended to limit the invention solely to the specific embodiments described, may best be understood in conjunction with the accompanying drawings, in which:

FIGS. 5A, 5B and 5C illustrate examples of steps executed according to embodiments of the present invention;

DETAILED DESCRIPTION

It is noted that in this disclosure and particularly in the claims and/or paragraphs, terms such as "comprises," "comprised," "comprising," and the like can have the meaning attributed to it in U.S. patent law; that is, they can mean "includes," "included," "including," "including, but not limited to" and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic of the invention. These and other embodiments are disclosed or are apparent from and encompassed by, the following description. As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Furthermore, the detailed description describes various embodiments of the present invention for illustration purposes and embodiments of the present invention include the methods described and may be implemented using one or more apparatus, such as processing apparatus coupled to electronic media. Embodiments of the present invention may be stored on an electronic media (electronic memory, RAM, ROM, EEPROM) or programmed as computer code (e.g., source code, object code or any suitable programming language) to be executed by one or more processors operating in conjunction with one or more electronic storage media.

As stated above, the present invention is directed to a content providing system that includes, for example, processing devices, hand held electronic devices, computers, tablets on-demand gaming devices that may include a handheld console, and/or similar device with processing capability, that can be used for providing content, such as on-demand casual games or applications or electronic media, on-line books, audio data, video data, movies, image data and other electronic content to users.

Figure 1:
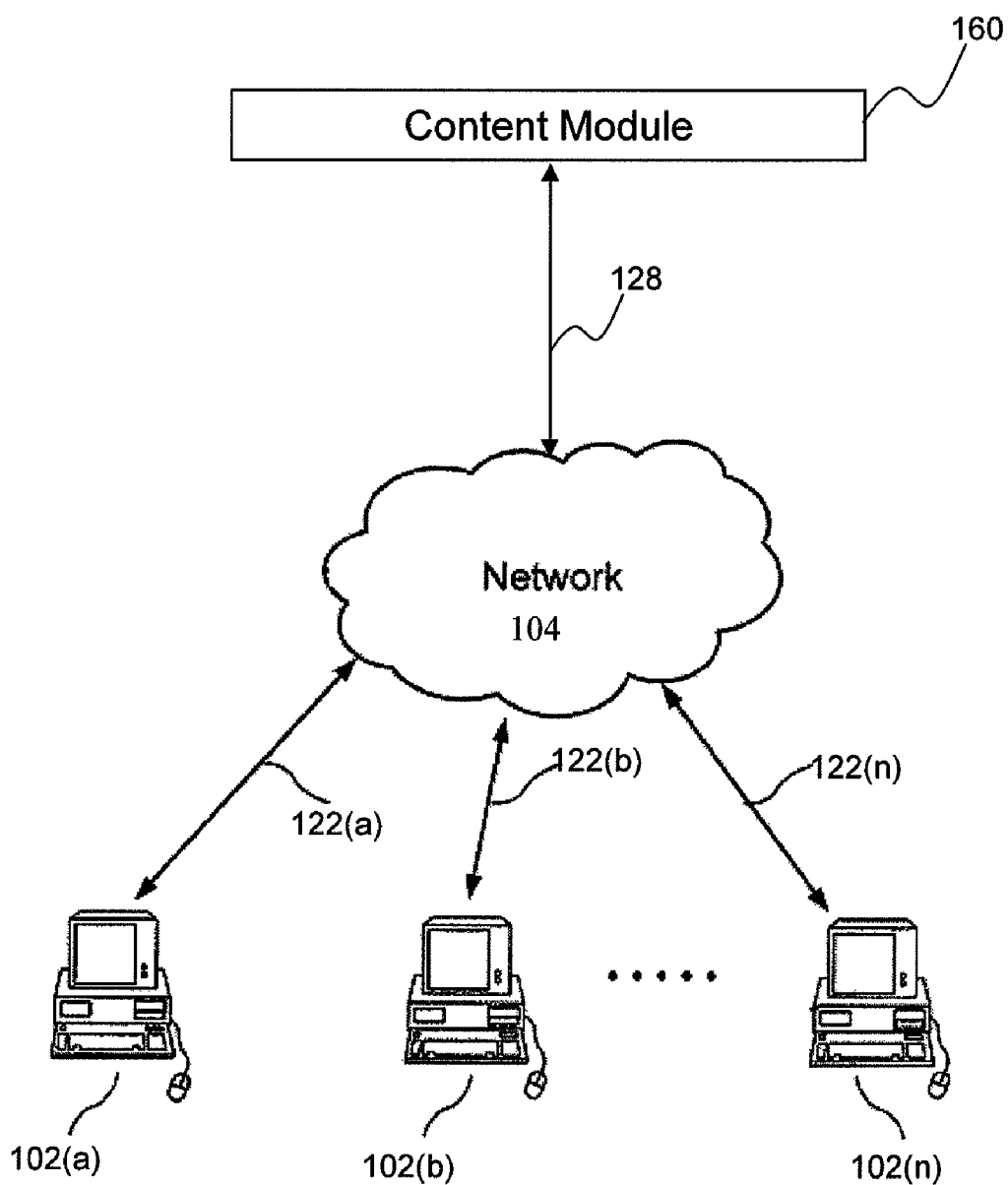
FIG. 1 illustrates an example of a network that supports embodiments of the present invention.

FIG. 1 illustrates an example 100 of a network that supports embodiments of the present invention.

Embodiments of the present invention may be implemented using one or more processing devices, or processing modules or processing facilities. The processing devices, or modules, or facilities, may be coupled such that portions of the processing and/or data manipulation may be performed at one or more processing devices and shared or transmitted between a plurality of processing devices.

Thus, an example of the invention is described in a network environment. Specifically, FIG. 1 shows a network environment 100 adapted to support various embodiments of the present invention. The exemplary environment 100 includes a network 104, a content module, or facility or unit 160. (A module, as used herein, is for example, a series of instructions stored on a computer-readable, or an electronic storage medium storing program code, or a memory unit storing instructions that is coupled to an associated dedicated processing unit for execution of the instructions, the module may be a plugin unit, stand alone set of instructions, or program code or may be an integral part of a larger component. Each module may be stored in a separate memory or a common computer memory.) FIG. 1 also shows a plurality of terminals 102(*a*) . . . 102(*n*), where "n" is any suitable number.

The network 104 is, for example, any combination of linked computers, or processing devices, adapted to transfer and process data. The network 104 may be private Internet Protocol (IP) networks, as well as public IP networks, such as the Internet that can utilize World Wide Web (www) browsing functionality. An example of a wired network is a network that uses communication busses and MODEMS, or DSL lines, or a local area network (LAN) or a wide area network (WAN) to transmit and receive data between terminals. An example of a wireless network is a wireless LAN. Global System for Mobile Communication (GSM) is another example of a wireless network. The GSM network is divided into three major systems which are the switching system, the base station system, and the operation and support system (GSM). Also, IEEE 802.11 (Wi-Fi) is a commonly used wireless network in computer systems, which enables connection to the Internet or other machines that have Wi-Fi functionality. Wi-Fi networks broadcast radio waves that can be picked up by Wi-Fi receivers that are attached to different computers.

Content module 160 may be for example a server computer operatively connected to network 104, via bi-directional communication channel, or interconnector 128, which may be for example a serial bus such as IEEE 1394, or other wire or wireless transmission medium. The terms "operatively connected" and "operatively coupled", as used herein, mean that the elements so connected or coupled are adapted to transmit and/or receive data, or otherwise communicate. The transmission, reception or communication is between the particular elements, and may or may not include other intermediary elements. This connection/coupling may or may not involve additional transmission media, or components, and may be within a single module or device or between the remote modules or devices.

The content module 160 is adapted to transmit data to, and receive data from, terminals 102(a) . . . (n), via the network 104. Content module 160 is described in more detail with reference to FIG. 2, herein.

Terminals 102(a) . . . (n) (where "n" is any suitable number) (generally referred to as 102) are coupled to network 104 via an associated bi-directional communication medium 122(a) . . . (n), which may be for example a serial bus such as IEEE 1394, or other wire or wireless transmission medium. Terminals 102 may be communication appliances, or user locations, or subscriber devices, or client terminals. For example, terminals 102 may be computers, or other processing devices such as wireless handheld device, PLAYSTATION™, PSP™, a desktop computer, laptop computer, personal digital assistant (PDA), and the like. They may be capable of processing and storing data themselves or merely capable of accessing processed and stored data from another location (i.e., both thin and fat terminals).

Terminals 102 typically include a display unit and an input unit. The display unit is used to display the data generated by the system 100 as well as input generated at the terminal 102, and the content generated by content module 160. The display unit of terminal 102 may be, for example, a monitor, LCD (liquid crystal display), a plasma screen, a graphical user interface (GUI) or other unit adapted to display output data typically by a representation of pixels to form text and graphic and video date. The input unit may include devices such as a keyboard, mouse, track ball and/or touch pad or any combination thereof.

The content module 160 and terminals 102 typically utilize a network service provider, such as an Internet Service Provider (ISP) or Application Service Provider (ASP) (ISP and ASP are not shown) to access resources of the network 104.

Figure 2:
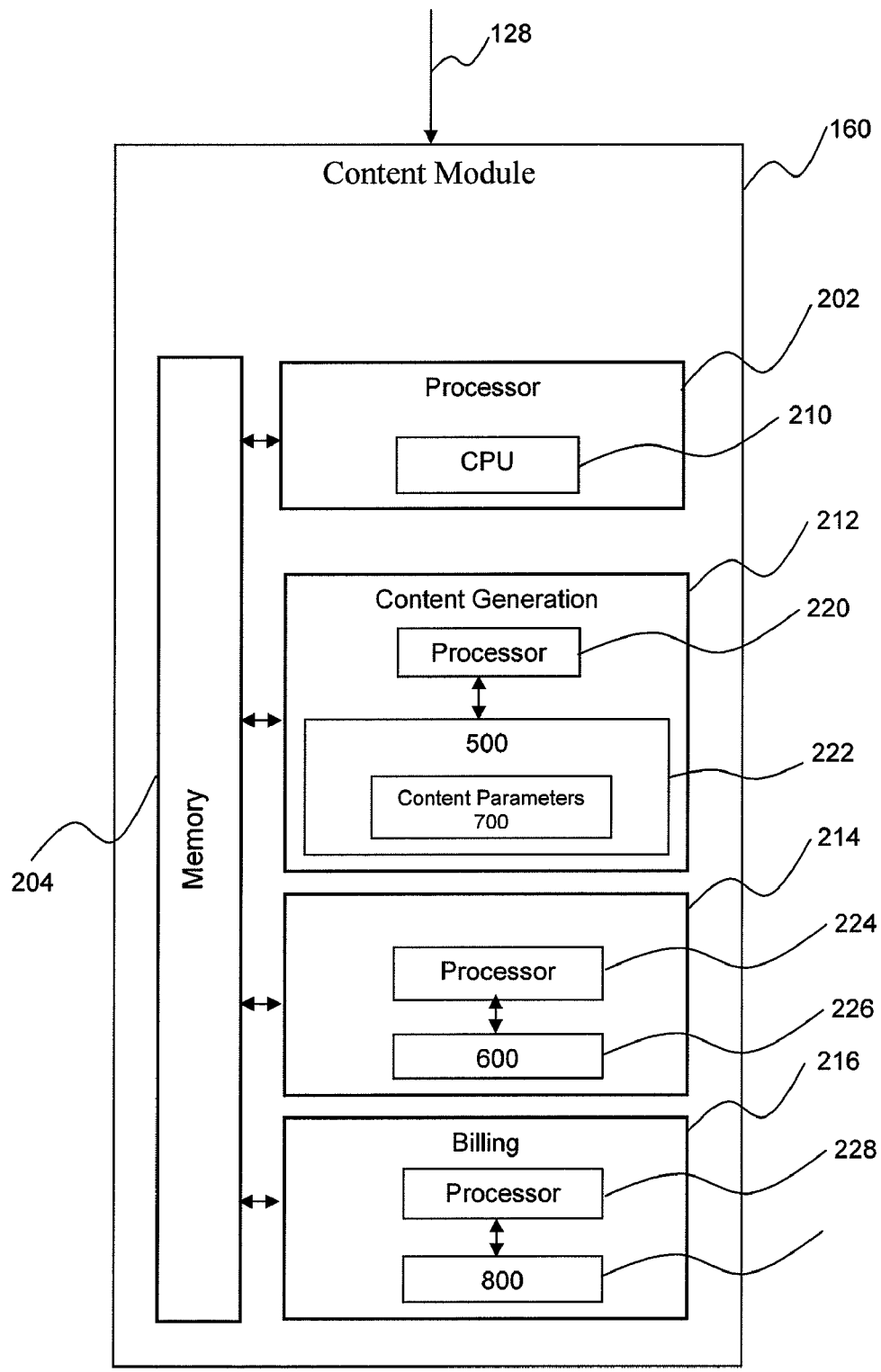
FIG. 2 illustrates an example of a processing apparatus that includes a content generation module, a user profile generation module and a billing module according to an embodiment of the present invention.

FIG. 2 illustrates an example of content module 160 that includes a processor module 202, a memory module 204, a content generation module 212, a user profile generation module 214 and a billing module 216 according to an embodiment of the present invention.

Processor module 202 is coupled to content generation module 212, user profile generation module 214, and billing module 216 via an associated communication link to enable processor module 202 to coordinate processing operations of the modules. The processor module 202 includes a CPU 210, which is typically a processor that includes an arithmetic logic unit (ALU), which performs arithmetic and logical operations, and a control unit (CU), which extracts instructions from memory and decodes and executes them, utilizing the ALU when necessary. An I/O interface may be used to operatively couple the components of processor module 202.

Memory module 204 stores programs, which include, for example, a web browser, algorithms, as well as typical operating system programs (not shown), input/output (I/O) programs (not shown), BIOS programs (not shown) and other programs that facilitate operation of content module 160. The web browser (not shown) is for example an Internet browser program such as Internet Explorer™. Memory module 204 may be, for example, an electronic storage medium, such as an electronic storage repository that can store data used by content module 160. The memory module 204 may include, for example, RAM, ROM, EEPROM or other memory media, such as an optical disk, optical tape, CD, or a floppy disk, a hard disk, or a removable cartridge, on which digital information is stored in the form of bits. The memory module 204 may also be remote memory coupled to processing module 202 via wired or wireless bi-directional communication medium.

Content generation module 212 includes a dedicated processor 220 and memory 222 which includes memory or storage locations 500, which are used to store generation algorithms and/or generation program code that may be stored on an electronic and/or computer-readable medium and executed by one or more processors to generate a content according to embodiments of the present invention and/or generate a display. The content generation module 212 further includes a content parameters module 700. Content module 160 is coupled to network (104 in FIG. 1) via bi-direction communication medium 128.

Algorithm 500 is described in relation to FIG. 5. Algorithm 500 further includes content parameter algorithm 700, which is described in relation to FIG. 7.

The content generation module 212 is adapted to receive input from a user, typically utilizing a terminal (shown as element 102 in FIG. 1), that represents content, such as electronic content, electronic media, audio data, text data, video data, audio/video data, on-line books, image data, photographic data, graphic data, albums, messages, games, application or other content to be generated and provided for use. The user is provided with a menu of options to select from to form the content of data, such as the game or the application. This is described in more detail with relation to FIGS. 3, 4 and 5A-5C herein. The user can select desired content at the terminal (e.g., 102, as shown herein).

User profile generation module 214 includes a dedicated processor 224 and memory module 226 that includes storage locations 600, which are used to store generation algorithms and/or generation program code that may be stored on an electronic and/or computer-readable medium and executed by one or more processors to generate user profile according to embodiments of the present invention. Algorithm 600 is described in relation to FIG. 6. The user profile generation module 214 generates and updates user profile, typically based on the information received from the user. The user profile may be used in the process of content generation.

Billing module 216 includes dedicated processor 228 and memory module 230 used to store a billing algorithm 800. Billing algorithm 800 is described in more detail in relation to FIG. 8 herein.

Figure 3:
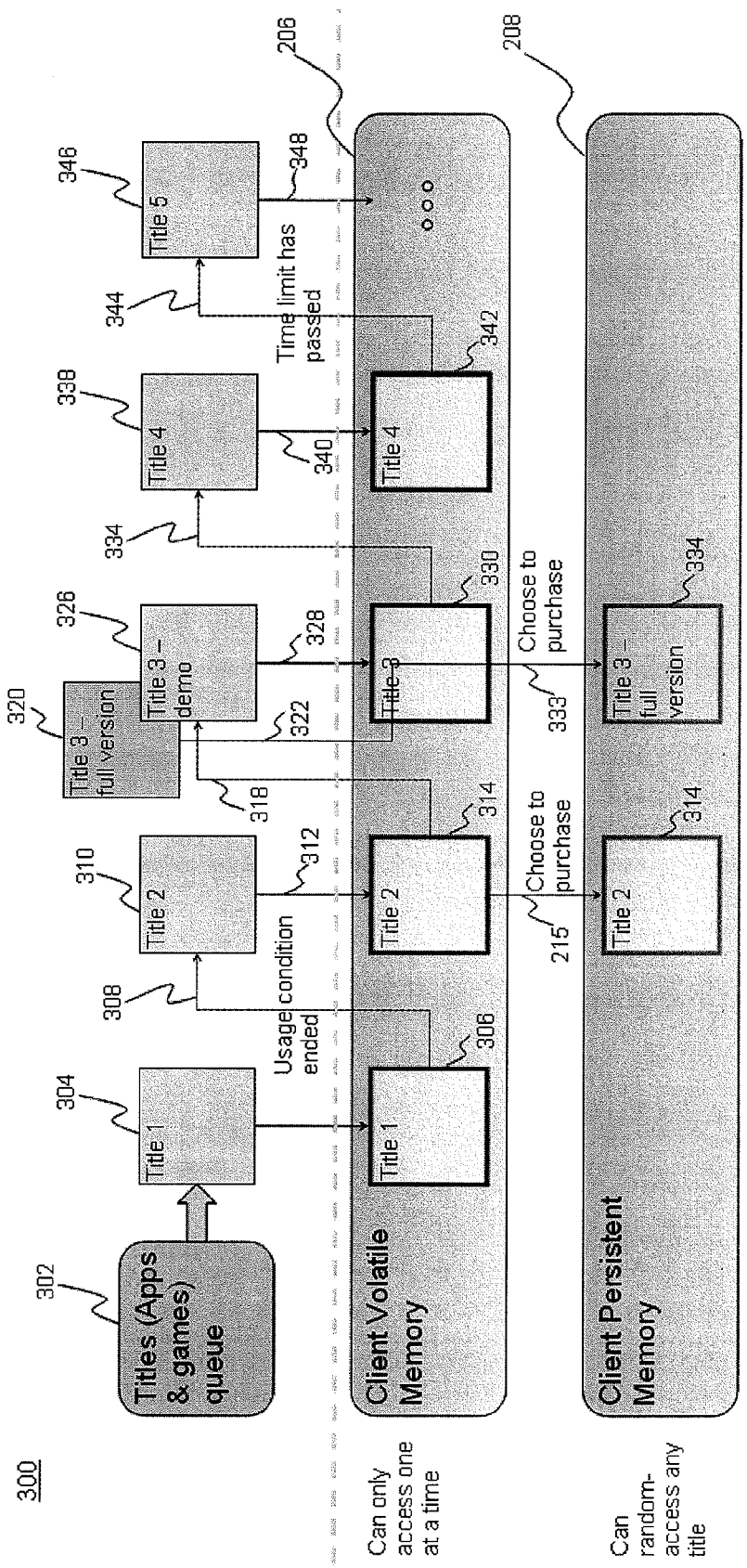
FIG. 3 shows an example of an algorithm used to sample and/or obtain content according to an embodiment of the present invention.

FIG. 3 shows an example 300 of a series of steps, or algorithm, or steps that may be written as program code (source code), or steps that have been compiled (object code) or a combination thereof that may be executed, and permits a user to sample, or try or preview and, if desired, purchase, rent, view or buy the content, such as described above (electronic content, electronic media, audio data, text data, video data, audio/video data, on-line books, image data, photographic data, graphic data, albums, messages, games, application or other content to be generated and provided for use). As shown in FIG. 3, there are two kinds of memory at the client side: client volatile memory 206 and client persistent memory 208. The queue of content (302) includes a number of titles listed in the order of Title 1, Title 2, Title 3, Title 4, and Title 5 . . . etc. While FIG. 3 shows five titles, which are shown and described herein, for illustrative purposes, it is an embodiment of the present invention that any suitable amount (quantity) and/or type (audio, video, on-line books) may be supplied. Any type of electronic content that can be disseminated may be provided according to embodiments of the present invention.

FIG. 3 will now be described using various element numbers, while the same element may be identified by a different number, this system is used to facilitate understanding of the embodiment. Title 1 (304) is an example of content, such as an application or a game that is not purchased by the user. As shown in FIG. 3, when the queue of content (302) is accessed by a user using a user's device, Title 1 (304), which is the first title in the queue (302), is downloaded to the client volatile memory 206 at this point Title 1 is shown as element 306. If the user does not want to purchase Title 1, download of Title 1 (306) will stop and, as shown by line 308, Title 2 (310) will be downloaded to client volatile memory 206, as shown by line 312 to Title 2 (314) in memory 206.

Title 2 (314) is an example of electronic content that, after being sampled by the user is purchased and downloaded (line 315) to persistent memory (208) (Title 2 is now represented by element number 316 in memory 208). Thus, after Title 2 (310) is sent to client (Title 2 314) volatile memory 206 and the user chooses to purchase Title 2 (314), Title 2 (314) is downloaded from client volatile memory 206 to client persistent memory 208 (Title 2 316).

Title 3 (full version 320 and sample version 326) is an example of content that is purchased and downloaded in two ways. One way is a user samples Title 3 before viewing, purchasing, or renting or otherwise accessing the full version. The second way is that the user accesses (purchase, rent, buy, view etc.) the full version (320) without a sample. The sample and access procedure is similar to Title 2 (310). After a sample of Title 2 (314) is viewed by a user, line 318 shows that Title 3 (demo, or sample) (326) is sent (shown by line 328) to client volatile memory 206 (Title 3, 330) and the user may choose to purchase Title 3 (330), Title 3 may be downloaded from client volatile memory 206 to client persistent memory 208, as shown by line 333 to Title 3 (full version) (334). However, also as shown in FIG. 3, a second accessing option is available as an alternate embodiment of the present invention that permits a user to purchase Title 3, the full version of Title 3 (320) may be downloaded directly (as shown by lines 332 and 333) to client persistent memory 208 (Title 3, full version 334) that is not sampled prior to accessing the full version of the content.

Title 4 (338) is an example of content that may be displayed when sample Title 3 (330) is declined by a user (previewing or accessing a portion of the full version of Title 3) as shown by line 336. After Title 4 (342) is sent to client volatile memory 206, if the user does not make any decision to purchase or affirmatively reject the sample (342) within a predetermined time limit, Title 4 (342) will be considered to be rejected by the user. Then download of Title 4 will stop and, as shown by line 344, Title 5 (346) will be downloaded to client volatile memory 206, as shown by line 348.

Thus, FIG. 3 shows an embodiment of the invention that permits a user to access, preview or sample a portion of content for a period of time. If during the sampling period, the user desires to view, purchase, rent, buy or otherwise access a full, or additional content, the additional content is provided. Thus, if a Title pertains to an electronic book (e-book) a user can preview the title of the book for a first period of time, for example 30 seconds. If within the first period of time the user desires to view additional data, a summary of the book can be previewed for a second period of time, for example, 2 minutes. If within the second period of time, the user wishes to view still more content related to thee-book, chapter 1 can be viewed. At some point in the preview, such as after chapter 1, a user may be required to pay a user's fee to continue viewing. The system of the present invention tracks how long a user views the preview, or sample, content to before making a decision to accept additional content or preview a different title. If a user rejects the sample, the time for the user to make the decision and specifically the stage (i.e., after viewing the title, after viewing the summary, or after viewing chapter 1) is also tracked and stored to update both the user profile and information about the title. While, FIG. 3 shows that the client volatile memory 206 allows access to only one title at a time, however, many applications or portions of content (sample or full version) may be downloaded from the queue (302) into the volatile memory (206) to disassociate download times and usage times. For example, one implementation is to use Flash applications because the size is relatively small to download.

Figure 4:
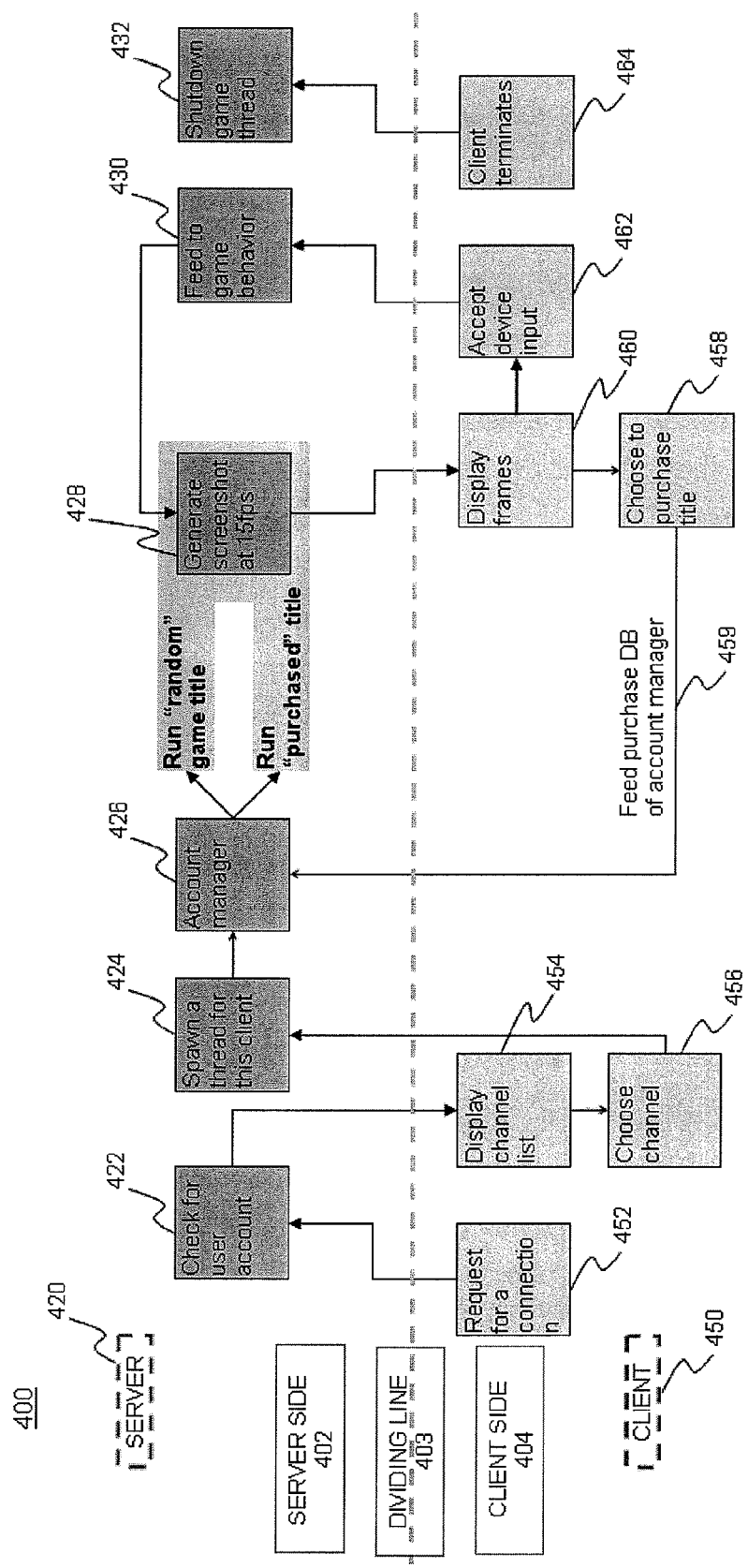
FIG. 4 shows a series of steps of content streaming without local storage according to an embodiment of the present invention.

FIG. 4 shows a series of steps 400 as an example of content streaming according to an embodiment of the present invention. As shown in FIG. 4, process 400 is performed without local storage in user device. As shown in FIG. 4, server side 402 and client side 404 are divided by dividing line 403. The steps shown at server side 402 are carried out by server module or sever computer 420, and the steps shown at client side 404 are carried out by client module, or client device 450.

The content streaming process begins in step 452 when the client module or client (not shown in FIG. 4) requests a connection with the server 420. After the client is connected, the server 420 checks for an associated user account as shown in step 422. According to user profile in user account, a channel list is displayed at the client side in step 454. The channel list may be displayed, to the client, for a predetermined period of time and/or each channel on the channel list may be displayed, to the client, for a predetermined period of time. After the user chooses a channel of interest, as shown in step 456, the server 420 spawns a thread for the client as shown in step 424. Then, at the server side, step 426 shows that an account manager, which may be a module, (having requisite memory and processing functionality) determines to run a "random" content providing function that provides content to the client. For example, a game title may be generated as shown in step 426. Step 428 shows that a screenshot is generated at 15 fps (frames per second), and the frames are displayed at the client side, as shown in step 460. If the user chooses to purchase the provided title, shown by step 458, the purchase decision is sent back to account manager, and the account manager determines to run "purchased" title, as shown by line 459 from purchase step 458 to account manager step 426. Then screenshot is generated by the server module 420 and frames are displayed at the client device, also as shown in step 428. In step 462, device input by the user is accepted and sent back to the server in step 430, and based on user's feedback, more screenshots are generated (428). When the client terminates the title in step 464, the server shuts down the game thread, as shown in step 432.

The process as shown in FIG. 4, provides that the server module 420 can run any suitable content module (e.g., game engine) to generate the desired frames. Furthermore, the client module can function to decode the frames and collect user's input. An example of a suitable application is an application that will be a safe run environment that produces relatively small output, however, the platform can be for example, any one of Flash, Windows, PLAYSTATION™ PS3™, PSP™, etc depending on the server running machine.

Figure 5B:
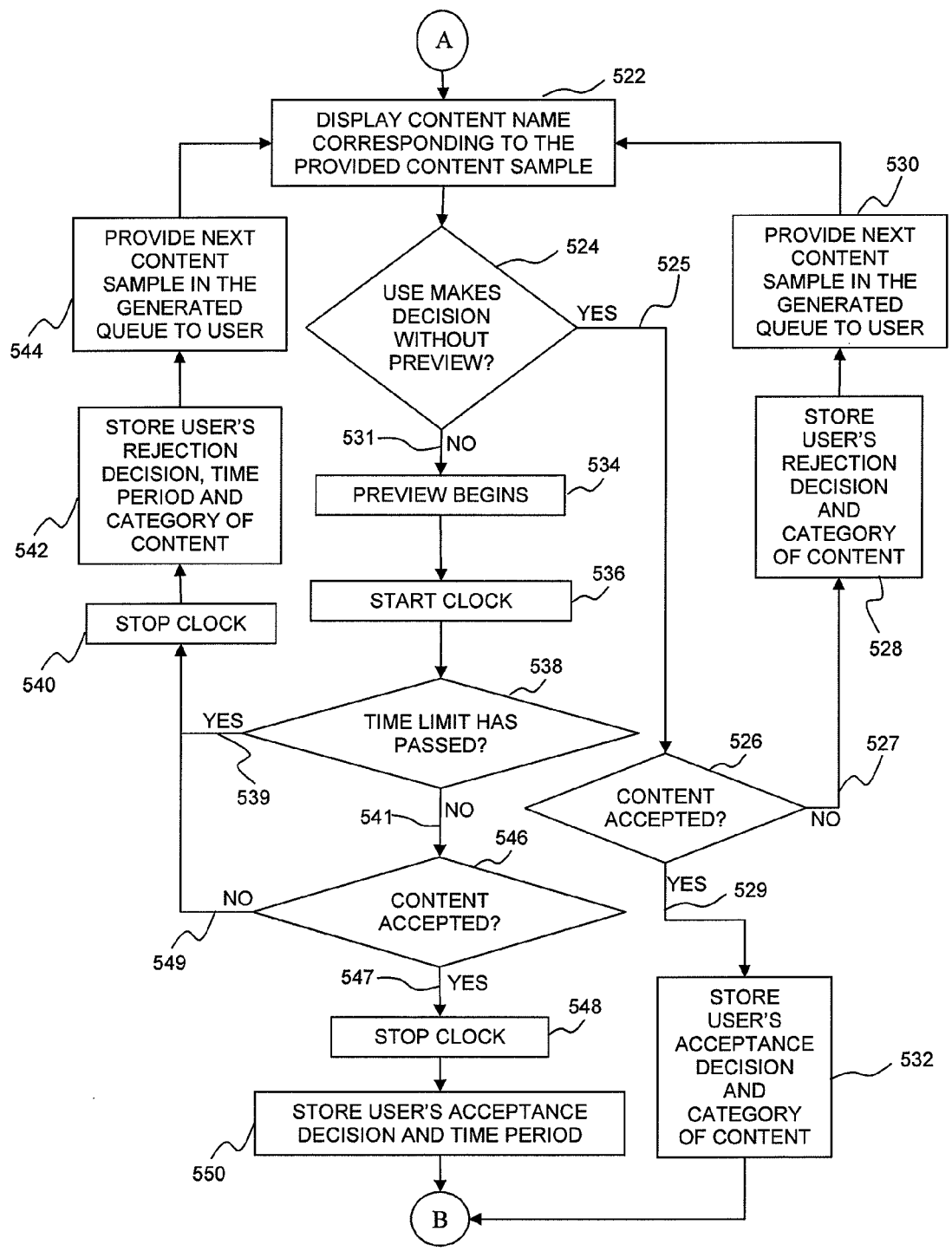
Figure 5C:
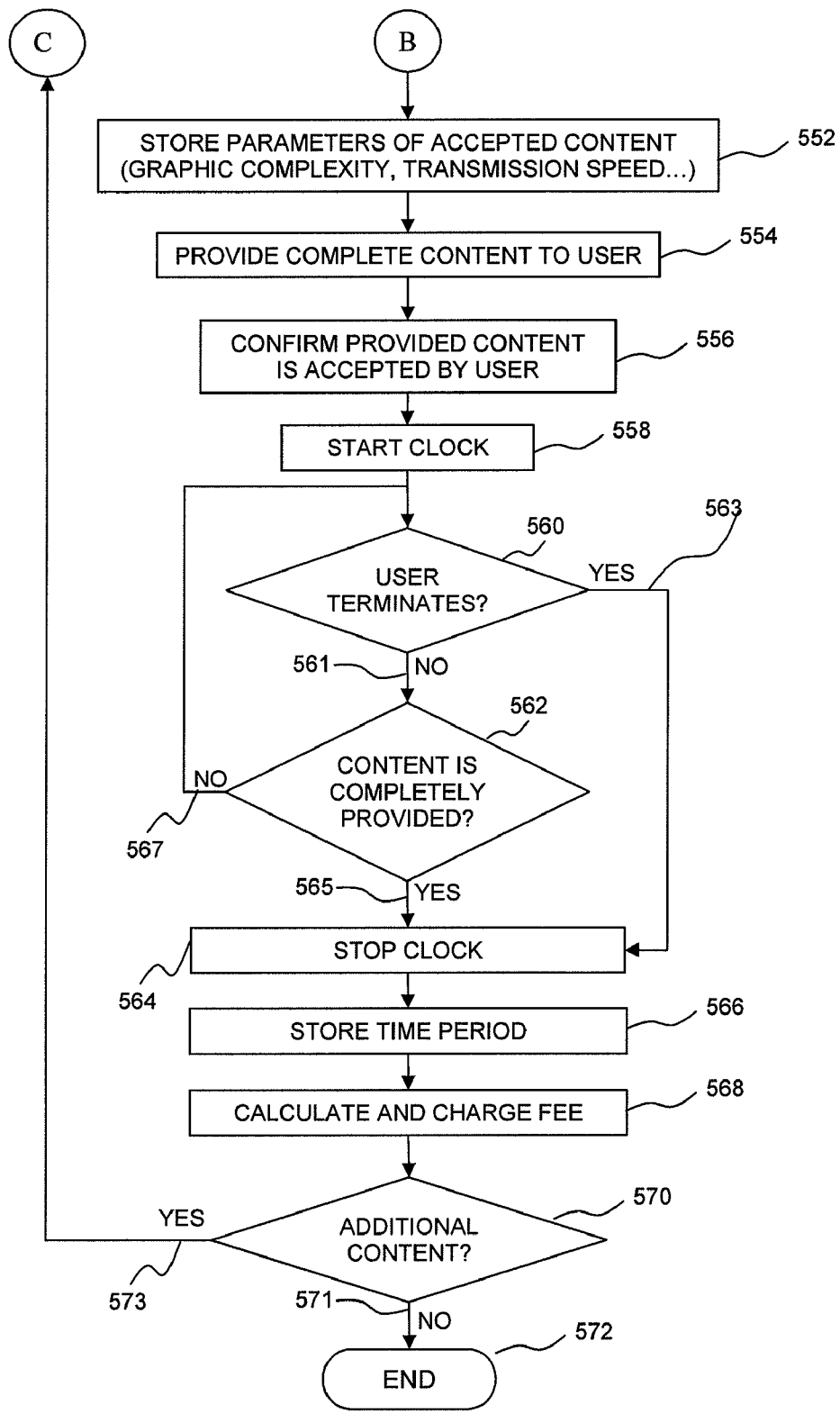

FIGS. 5A, 5B and 5C show a series of steps that may be used to generate content according to an embodiment of the present invention. As shown in FIGS. 5A-5C, the series of steps may be represented as a flowchart 500 that may be executed by a processor, or otherwise executed to perform the identified functions and may also be stored in one or more memories and/or one or more electronic media and/or computer-readable media, which include non-transitory media as well as signals. For example, the steps of FIGS. 5A-5C may be stored on a computer-readable medium, such as ROM, RAM, EEPROM, CD, DVD, or other non-volatile memory, non-transitory media. The program code stored on an electronic memory medium is a structural element. The process 500 begins with start step 502.

After a user subscribes in step 504, the user may have an option to select previewing content (such as titles or samples or trailers or other less-than-complete versions of the content) or viewing the actual content. The content is any electronic content as described herein (such as games and applications). Step 506 shows that content can be provided based on a channel list. If the user declines, "no" line 507 leads to step 508 to generate a queue of contents based on user preference indicated by the user profile (including the response to decline the content), and then a sample content of the first content in the generated queue will be provided to the user's device, as shown in step 520. If the user selects "yes" in step 506, "yes" line 509 leads to step 510 to display a channel list showing all the channels. In step 512 the user selects a desired channel, and then a queue of all contents belonging to the selected channel is generated, as shown in step 514. Decision step 516, provides that the user may have an option to select to provide contents based on user preference in the selected channel. If the user selects "no", i.e., to provide contents randomly, "no" line 519 leads to step 520 to provide a sample content of the first content in the queue generated in step 514. If the user selects "yes" in step 516, "yes" line 517 leads to step 518 which generates a queue of contents which lists the contents belonging to the selected channel in order based on the user preference, and then in step 520, a sample content of the first content in the queue generated in step 518 will be provided to the user's gaming device.

In step 522, the name of the content which is provided in step 520 is displayed on the gaming device, and then in step 524 the user may have an option to make purchase decision without previewing the content sample. If the user selects to make decision without preview, "yes" line 525 leads to step 526 where the user makes the decision whether or not to accept the content, i.e., to purchase the content. If the user will purchase the content, "yes" line 529 leads to step 532 to store the user's acceptance decision and the category of the accepted content in user preference. If the user selects to reject the content in step 526, "no" line 527 leads to step 528 to store the user's rejection decision and the category of the rejected content, and then a content sample of the content next to the rejected content in the queue will be provided to the user's gaming device in step 530.

If, in step 524, the user selects to preview the content sample before making purchase decision, "no" line 531 leads to step 534 which shows that the preview of the content sample begins. In step 536 the clock starts tracking the time of the preview to determine how long the preview is displayed. Step 538 is a decision step that determines whether a time limit of sample preview has passed. If it is determined that the elapsed time exceeds the time limit, which means the user does not accept the content within the time limit, "yes" line 539 leads to step 540 to stop the clock, and in step 542 the user's rejection decision, the time length of the elapsed time and the category of the rejected content are stored in the user preference, and then a content sample of the content next to the rejected content in the queue will be provided to the user's gaming device in step 544. Thus, if a user has not affirmatively accepted the content that is being previewed, within a predetermined time interval, that is deemed as a rejection of the provided sample content.

If, in step 538, it is determined that the elapsed time does not exceed the time limit, "no" line 541 leads to step 546 where the system determines whether the user accepts the content. If the user selects to reject the content in step 546, "no" line 549 leads to step 540 to stop the clock, and in step 542 the user's rejection decision, the time length of the elapsed time and the category of the rejected content are stored in the user preference, and then a content sample of the content next to the rejected content in the queue will be provided to the user's gaming device in step 544.

If, in step 546, the user selects to accept and purchase the content, based on the preview sample, "yes" line 547 leads to step 548 to stop the clock, and in step 550 the system stores the user's acceptance decision, the category of the accepted content and the time length of the elapsed time in user preference. Thus, the amount of time the user need to make an affirmative acceptance of the preview is tracked and recorded. This enables the user profile of the user to store the date, such as the time needed by a user to accept the preview content. If the time for acceptance is very short, for example, less than 10 seconds, the user profile will indicate the acceptance as a strong like. If the time for acceptance is longer, for example, 30-45 seconds, then the user profile indicates this as a mild like, since it required more than 10 seconds for the decision of the user. Thus, the steps of FIG. 5 provide a user profile that reflects how long a user needed to either accept or reject the preview content, of the sample data. Specifically, the time for acceptance or rejection of the sample content is used to determine the type of sample content, or preview data provided to the user. Thus, the user will typically not receive preview, or sample content that is similar to sample content rejected by the particular user.

Figure 6:
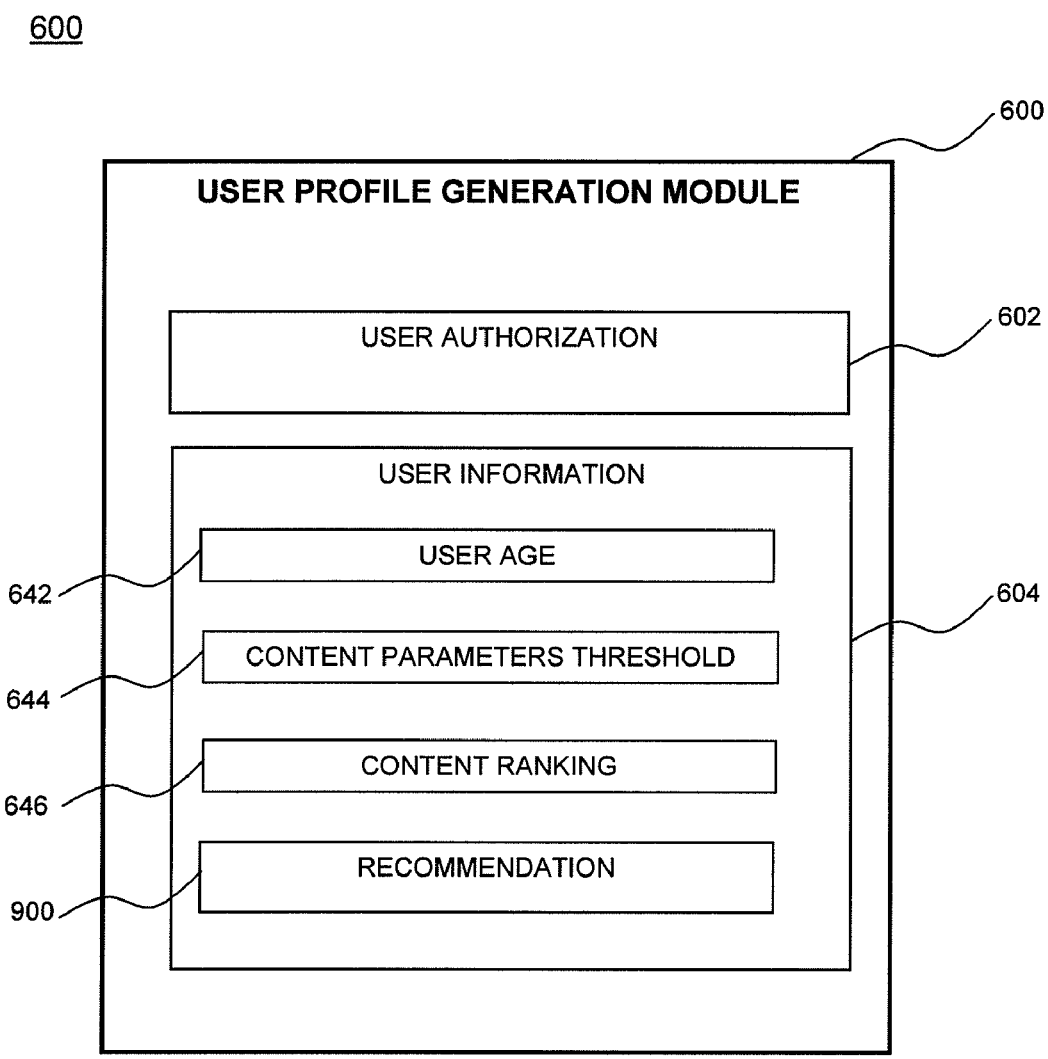
FIG. 6 shows an example of user profile generation module according to an embodiment of the present invention.

In step 552, content parameters, such as graphic complexity of the content, transmission speed of the content, color, audio data, rating of the content ("G", "PG", PG-13, "R", etc.) genre, category (videogame, movie, e-book etc.), of the accepted content are stored, which is used to calculate content parameters threshold (see step 644 of FIG. 6). Then in step 554, the complete content corresponding to the accepted content sample is provided to the user. After confirming that the provided content is accepted by the user in step 556, the clock starts counting again in step 558. In step 560, the system determines whether the user has terminated the provided content. If so, "yes" line 563 leads to step 564 to stop the clock. This enables a record of early termination of the content. For example, as described herein, a user can preview an e-book, by viewing the title and perhaps a summary and chapter 1 of the book. If the user accepts the entire book, the text is provided to the user. If, however, the user only reads the first three chapters, the elapsed time/amount of content provided is tracked to provide additional feedback that the user did not view all the content. Referring back to step 560, "no" line 561 leads to step 562 to determine whether the content has been completely provided to the user. If it is not completed yet, "no" line 567 leads back to step 560. Otherwise, "yes" line 565 leads to step 564 to stop the clock. Then in step 566 the time length of the elapsed time from the clocks starts in step 558 to the clocks stops in step 564 is stored. Then in step 568, the fee of the provided content is calculated and charged to the user. The calculation of the fee according to the billing module is further described in FIG. 8.

After the fee is charged in step 568, the user may have an option to ask the system to provide additional contents, such as other games or applications, as shown in decision step 570. If the user selects additional contents, "yes" line 573 leads back to step 506, and then a new content generation process begins. Otherwise, no additional content is selected and "no" line 571 leads to end step 572.

FIG. 6 shows an example of user profile generation module 600 according to an embodiment of the present invention. Generally, the user profile generation module 600 comprises at least two portions: user authorization module 602 and user information module 604.

The user authorization module 602 is used for the server to identify different users using the same device. For example, although any user other than the owner of a gaming device may use the same gaming device after they log into their own account, they can not read private messages or affect the owner's user preference.

The user information module 604 includes user age module 642, content parameters threshold module 644, content ranking module 646 and recommendation module 900. The user age module 642 stores the user's age. Content parameters threshold module 644 calculates the thresholds of parameters of contents, such as graphic complexity and transmission speed, nature of the content, genre, according to the user preference. For example, if the user prefers the contents with high graphic complexity and high transmission speed, the content whose parameters are less than the parameter thresholds will not be provided to the user. The content ranking module 646 ranks the contents according to the user's review and acceptance/rejection decisions and times for decision, corresponding to the contents, so that the queue of contents are generated based on the content ranking. The recommendation module 900 is carried out for pushing a game from a first user to a second user who is a friend of the first user. In this case the pushed game will be available to the second user with a click of a button, after he/she has read the recommendation from the first user. The process of recommendation module 900 will be described in detail in FIG. 9.

Figure 7:
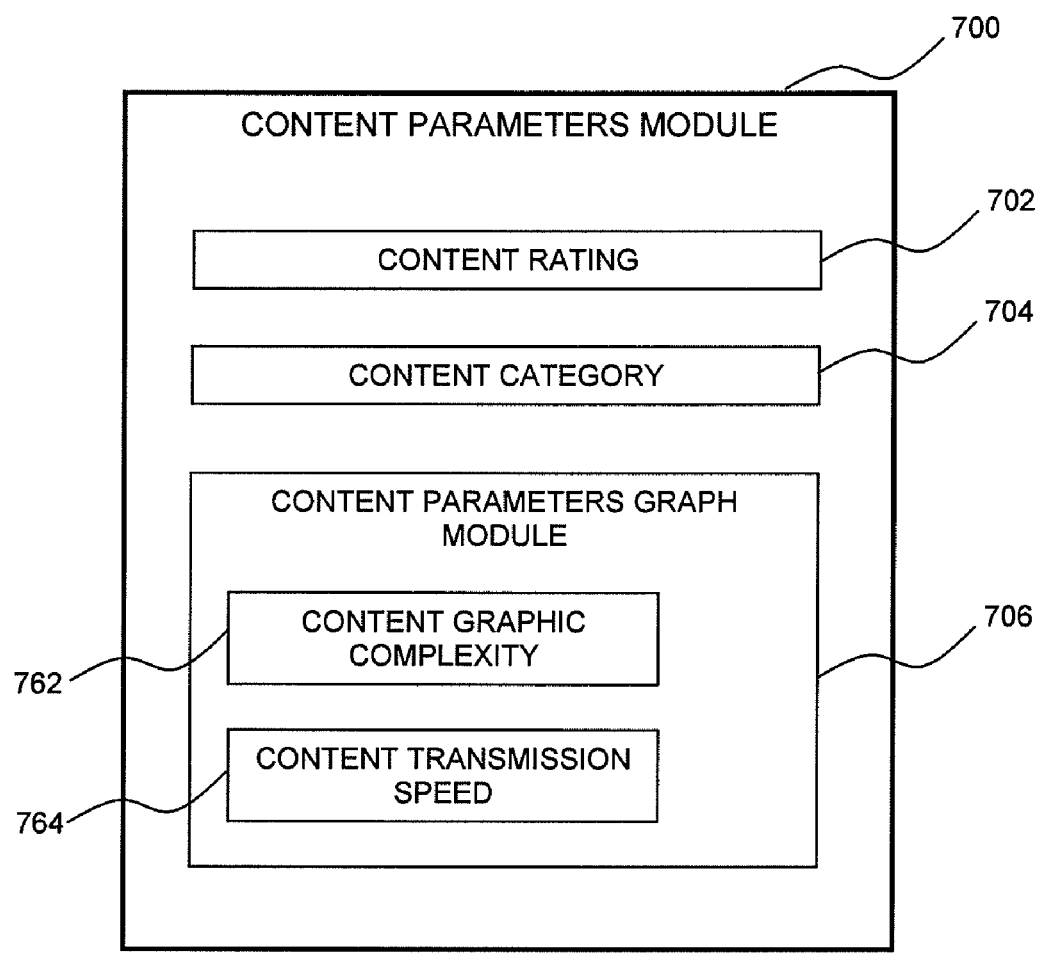
FIG. 7 shows an example of a processing module according to an embodiment of the present invention.

FIG. 7 shows an example of content parameters module 700 according to an embodiment of the present invention. The content parameters module 700 includes a content rating module 702, a content category module 704 and a content parameters graph module 706. The content rating module rates content's thematic and content suitability for certain audiences. For example, the ratings may be "G" for general audiences, "PG" for parental guidance suggested, "PG-13" for parents strongly cautioned, and "R" for restricted, etc. The content category module 704 classifies all the contents into different categories, such as sports, music, educate, etc. The content parameters graphic module 706 graphic the content graphic complexity 762 and content transmission speed 764, so that no contents whose parameters are less than the content parameters thresholds will be provided to the user.

Figure 8:
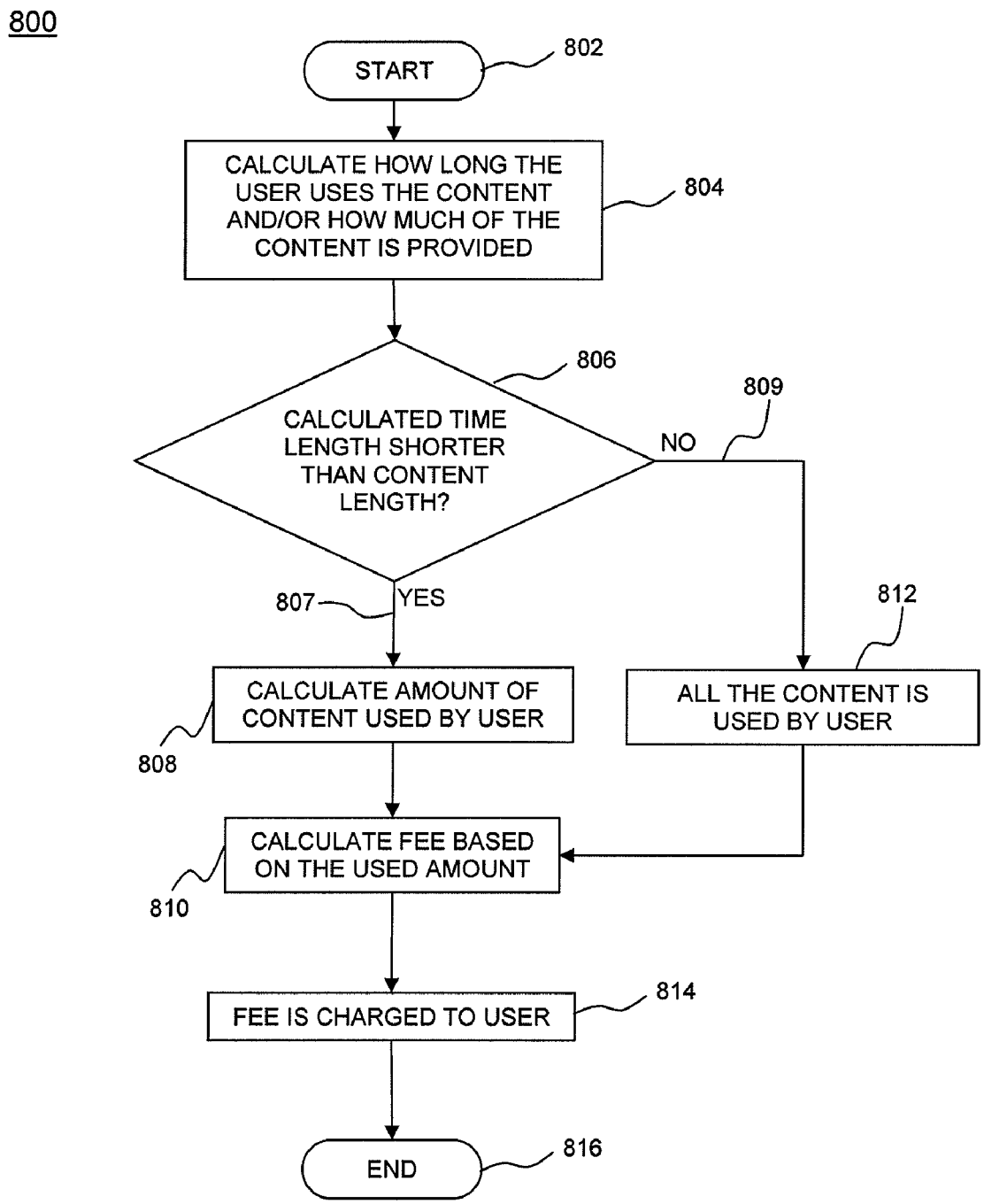
FIG. 8 is an example of steps executed according to embodiments of the present invention.

FIG. 8 is shows certain process steps 800 carried out by billing module of FIG. 2. After the billing process starts in step 802, the system calculates the time length of the elapsed time (shown in FIG. 5, step 566), which indicates how long the user has used the desired content and/or how much of the content has been used or viewed, as shown 804. For example, if a user accesses an album, the number of songs listened to, or the amount of time the user listens to the album can be tracked and recorded. Furthermore, if a user purchases an e-book, the amount of text the user read can be tracked and/or recorded. Thus, if a user, or multiple users read only the first two chapters of an e-book, the publisher of the e-book may not wish to publish another book by that author. Thus, how much of the content/album was used. Then in step 806 the system determines whether the calculated time length is shorter than the content length. If it is shorter, which means the user terminates the provided content before the content is completed, "yes" line 807 leads to step 808 to calculate the amount of content that has been used by the user, and then in step 810 the fee is calculated based on the used amount of the content. Otherwise, if the calculated time length is not shorter than content length in step 806, "no" line 809 leads to step 812 where the system determines that the content is completely provided and used by the user, and then the full amount of the content fee is calculated in step 810. Then in step 814 the calculated fee is charged to the user and end step 816 is reached.

Figure 9:
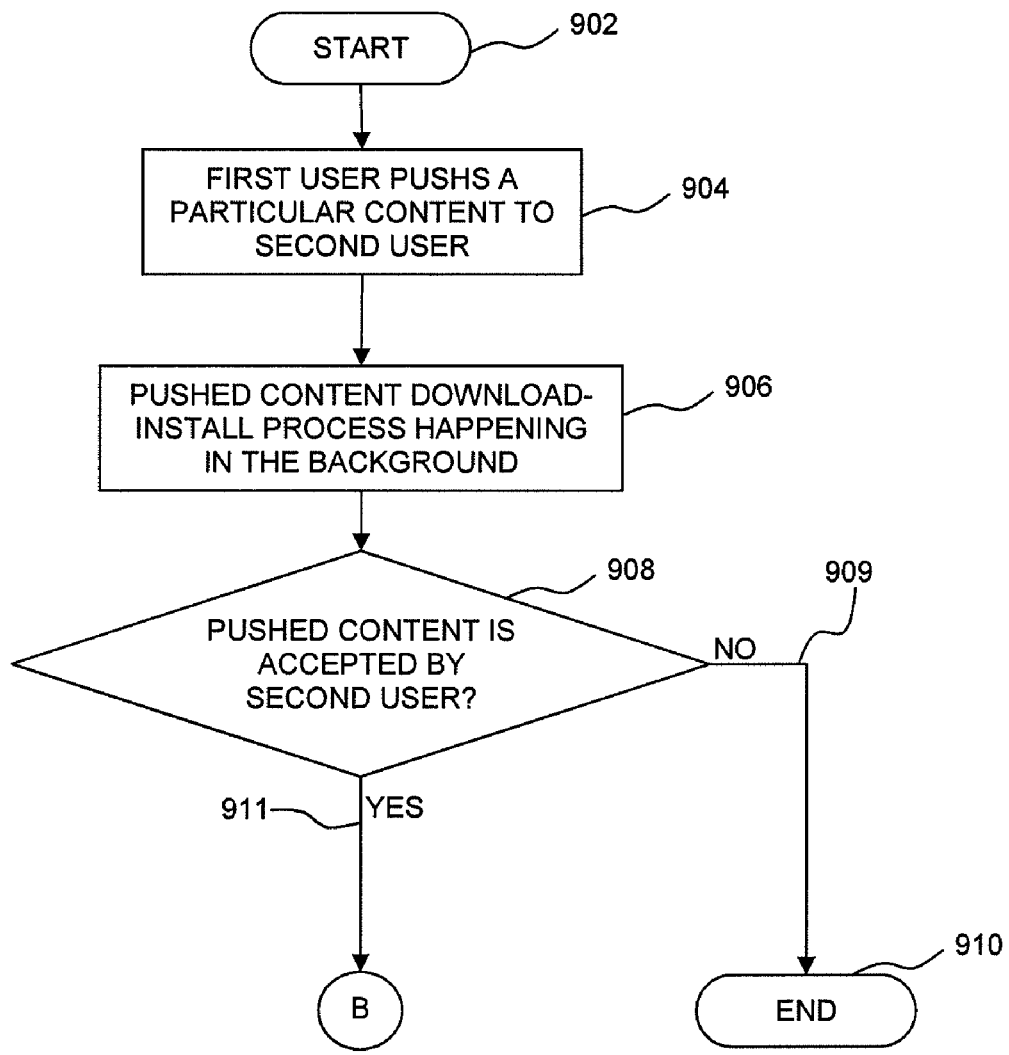
FIG. 9 is an example of processing steps according to an embodiment of the present invention.

FIG. 9 is shows a recommendation process steps 900 executed by the recommendation module of FIG. 6. The recommendation process starts in step 902. In step 904 a first user using a first gaming device may push, i.e., recommend a particular content (a game or an application) to a second user who is one of his/her friends. In embodiments of the present invention, the user device, such as a gaming device (PSP™, PS3™) includes a certain amount of memory that may be used for a cached download, such as the client volatile memory (shown as element 206 of FIG. 3). As a result, in step 906, the user device used by the second user, a download-install process executes in the background. In step 908 the second user may have an option to determine whether or not to accept the content pushed from the first user. If the second user selects to accept the pushed content, "yes" line 911 leads to node B of FIG. 5C, and the following process will be same as the process shown in FIG. 5C. Otherwise, if the second user rejects the pushed content, "no" line 909 leads to end step 910.

Figure 10:
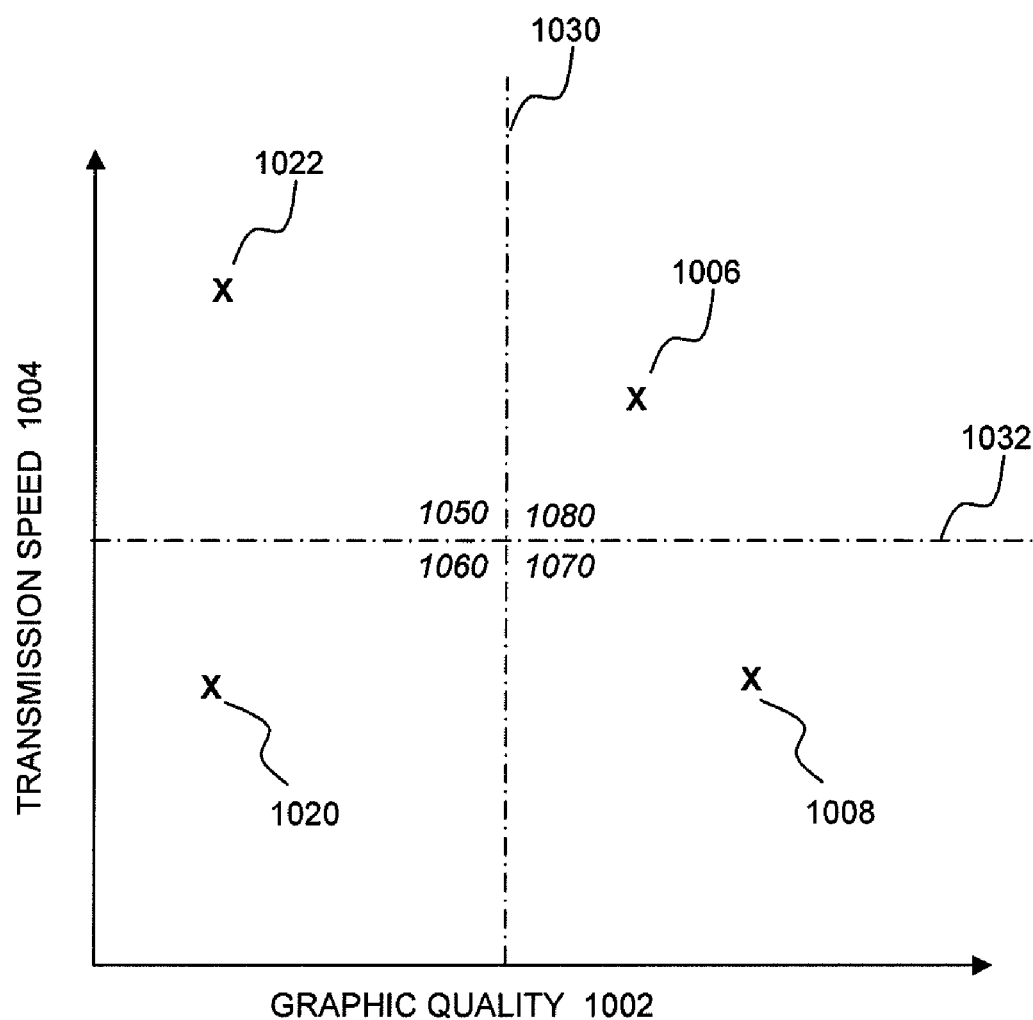
FIG. 10 shows a graph of sample content parameters according to an embodiment of the present invention.

FIG. 10 shows an example of a graph 1000 that demonstrates a relationship between parameters, for example transmission speed and graphic quality. While the parameters of transmission speed and graphic quality are shown in FIG. 10, other parameters may also be analyzed in a similar fashion. As shown in graph 1000, graphic quality is plotted on the X-axis 1002 and transmission speed of the content is plotted on the Y-axis 1004. point 1020 shows that the graphic quality and transmission speed are relatively low. This means that the game, or the electronic content is relatively uncomplicated. Point 1022 shows that the corresponding electronic content has a higher transmission speed and relatively low graphic quality. This type of electronic content may be for example, an e-book that is desired to be transmitted relatively quickly; but does not have sophisticated graphics, such as color and images. Point 1008 corresponds to electronic content that has a low transmission speed but relatively high graphic quality and point 1006 corresponds to electronic content that has relatively high transmission speed and relatively high graphic quality. Point 1006 may correspond to a video game such as a racing car video game. The terms relatively high and relatively low, as used in relation to FIG. 10, typically describes a data point, for example, more or less than 50%, or in a particular quadrant, 1050; 1060; 1070; and 1080. The quadrants are divided by lines 1030 (vertical) and 1032 (horizontal). The data point quadrant of the electronic content may be used to determine whether the threshold value has been reached.

Various embodiments of the embodiments of the present invention will now be described in relation to the description and figures mentioned above. For example, as described herein, embodiments of the present invention relate to a method, a system and/or an apparatus of providing electronic content data to a user. The method may be stored on a non-transitory computer-readable medium and the apparatus may be a system with modules, such as software modules including program code stored in electronic form that can be executed by one or more processors. The electronic content may be, for example, a music album, an e-book, a video game, a movie, a single song release, image data, such as a photo album or artistic display or any data that can be expressed in an electronic format. A portion, or preview portion, or sample of the content is then provided to a user device. The sample portion is filtered such that inappropriate material, such as "R" rated movies, is not provided to a young child. The sample content could also be, for example, a movie trailer or other portion of the content.

A user response to the sample content is identified. This response is either an acceptance of the content being previewed or a rejection of the content being previewed. The acceptance or rejection of the sample can be used to generate a user profile.

After the first sample is provided to a user, depending on the response by the user (acceptance or rejection). A second preview sample can be provided to the user. (If the first sample was accepted, the user can either view the content after accepting or store the content for viewing/listening (accessing) at a later time.) If the user accepts the second sample, content associated with the second sample can be provided to the user, either for accessing at that time or a later time.

For example, the sample data may be a first song of an album, or the first minute of a song, or a movie trailer, or a portion of an e-book, or a small portion of a video game, or other preview content.

The additional content is not provided to the user when the response to the sample data indicates a negative indication, that is the user at the user device does not desire the additional content data. While the user is previewing the content, a clock is tracking the amount of time the user is previewing the content. A predetermined time limit can be established, such that a user only receives a certain amount of content, for example 15 seconds, before the preview ends and the user choice is deemed a rejection. The clock can also be used to determine how quickly a user accepts, or provides a positive indication, to the preview to accept the content data. Furthermore, in addition to the clock, a quantity of electronic data can also be monitored. This is useful when the data is text data, such as an e-book. The e-book is different since one user may not read as fast as another user. Thus, for electronic data that is viewed according to to a user's ability to assimilate the material, the amount of content provided is tracked rather than the time the data is provided.

The user profile can then updated based on the response by the user to the preview. The time and/or the amount of content provided for the user's choice can be used to determine how strongly the user desires the content.

The sample data, and associated content data, may be categorized based on parameters, such as genre, maturity level, graphic quality, transmission speed, and other features of the content. The determination of a threshold for the parameters may be determined based on thresholds, which may be graphed. The use of quadrants on the graph can establish a relationship between multiple parameters. A user profile can establish certain thresholds that are minimum requirements for a user to receive either sample data or content data.

It is also an embodiment of the invention that a fee is charged for the additional content data provided to the user based on the elapsed time indicated in the response.

It is also an embodiment of the present invention that different users using a particular user device are identified. Thus, a particular user can be identified with a particular device. As described herein, a user at a device can send content to another user, who may also use the same device.

It is also an embodiment of the invention that the sample content are provided to the user based on the user profile data, independently of user selecting operation. Thus, content can be pushed from one user to another user.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device, such as a non-transitory computer-readable medium. The application program can be uploaded to, and executed by, a machine, such as a processor, CPU or compiler, comprising any suitable architecture.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A method of providing data comprising: providing sample content to a user device, the sample content being a portion of content data; identifying a response to the sample content by a user of the user device; providing second sample content to the user device based on the sample content; wherein additional content data is provided to the-user device when the response indicates a positive indication, that indicates that a user at the user device desires the additional content data, wherein additional content is not provided to the user device when the response indicates a negative indication, that indicates that a user at the user device does not desire the additional content data, wherein the response indicates: an elapsed time that the sample content was provided prior to receiving the positive indication or the negative indication; and updating a user profile data based on the response wherein the sample content is provided to the user device based on a content ranking, the ranking based on the response to the sample content by the user and the elapsed time indicated by the response, and wherein parameters of the sample content include transmission speed and the transmission speed of the sample content is greater than a transmission threshold.

2. The method according to claim 1, wherein the sample content comprises a preselected quantity of content.

3. The method according to claim 1, wherein the sample content is provided to the user device based on a rating associated with the sample content.

4. The method according to claim 3, wherein the rating is based on subject matter of the content.

5. The method according to claim 2, wherein parameters of the sample content are shown in a graph, the parameters including electronic graphic data.

6. The method according to claim 5, wherein the electronic graphic data of the sample content is greater than an electronic graphic data threshold.

7. The method according to claim 6, wherein the electronic graphic data threshold is determined according to a rating associated with the sample content.

8. The method according to claim 1, wherein the transmission speed threshold is determined according to a rating associated with the sample content.

9. The method according to claim 1, wherein a fee is charged for the additional content data provided to the user based on the elapsed time indicated in the response.

10. The method according to claim 1, further comprising:
monitoring when the user stops the sample content; and
calculating a first time that the user spends using the sample content.

11. The method according to claim 10, further comprising:
monitoring when the user stops the additional content data; and
calculating a second time that the user spends in using the additional content data.

12. The method according to claim 1,
monitoring when the user stops the sample content;
calculating a first time that the user spends using the sample content;
monitoring when the user stops the additional content data;
calculating a second time that the user spends in using the additional content data;
wherein the rating is modified based on the first time and the second time.

13. The method according to claim 1, further comprising:
setting a time limit to the elapsed time that the sample content was provided prior to receiving the positive indication or the negative indication.

14. The method according to claim 1, further comprising:
deleting sample content when the number of the negative indications indicated by the response to the sample content exceeds a predetermined value.

15. The method according to claim 1, further comprising:
identifying different users using a particular user device.

16. The method according to claim 1, wherein the sample content are provided to the user based on the user profile data, independently of user selecting operation.

17. The method according to claim 1,
monitoring when the user stops the sample content;
calculating a first amount of sample content accessed by the user;
monitoring when the user stops the additional content data; and
calculating a second amount of content accessed by the user;
wherein the rating is modified based on the first amount and the second amount.

18. A method of providing data comprising:
providing a sample content to a user device based on user profile data, the sample content being a portion of content data;
identifying a response to the provided sample content by a user of the user device:
updating the user profile data based on the response to the provided sample content;
providing the content data corresponding to the provided sample content to the user device, when the response indicates a positive indication, that indicates that a user at the user device desires the content data corresponding to the provided sample content; and
providing another sample content, which is a portion of another content data, to the user device, when the response indicates a negative indication, that indicates that a user at the user device does not desire the content data corresponding to the provided sample content;
wherein the response indicates an elapsed time that the sample content was provided prior to receiving the positive indication or the negative indication, and
wherein the sample content is provided to the user device based on a content ranking, the ranking based on the response to the sample content by the user and the elapsed time indicated by the response, and
wherein parameters of the sample content include transmission speed and the transmission speed of the sample content is greater than a transmission threshold.

19. A system for providing data comprising:
a content module that provides sample content, the sample content being a portion of content data;
a user device that receives that sample content and identifies a response to the sample content by a user of the user device;
wherein the system generates user profile data based on the response to the sample content;
wherein the content module provides second sample content to the user device based on the sample content;
wherein additional content data is provided to the user device, from the content module, when the response indicates a positive indication, that indicates that a user at the user device desires the additional content data;
wherein additional content is not provided to the user device when the response indicates a negative indication, that indicates that a user at the user device does not desire the additional content data,
wherein the response indicates:
an elapsed time that the sample content was provided prior to receiving the positive indication or the negative indication;
wherein the user profile data is updated based on the response, and
wherein the Sample content is provided to the user device based on a content ranking, the ranking based on the response to the sample content by the user and the elapsed time indicated by the response, and
wherein parameters of the sample content include transmission speed and the transmission speed of the sample content is greater than a transmission speed threshold.

20. The system according to claim 19, wherein the sample content comprises a preselected quantity of content.

21. The system according to claim 19, wherein a fee is charged for the additional content data provided to the user based on the elapsed time indicated in the response.

22. The system according to claim 19, further comprising:
wherein the content module monitors when the user stops the sample content; and
calculates a first time that the user spends using the sample content.

23. A system for providing data comprising:
a user device; and
a content module adapted to:
provide a sample content to the user device based on user profile data, the sample content being a portion of content data;
identify a response to the provided sample content by a user of the user device;
update the user profile data based on the response to the provided sample content;
provide the content data corresponding to the provided sample content to the user device, when the response indicates a positive indication, that indicates that a user at the user device desires the content data corresponding to the provided sample content; and
provide another sample content, which is a portion of another content data, to the user device, when the response indicates a negative indication, that indicates that a user at the user device does not desire the content data corresponding to the provided sample content;
wherein the response indicates an elapsed time that the sample content was provided prior to receiving the positive indication or the negative indication, and
wherein the sample content is provided to the user device based on a content ranking, the ranking based on the response to the sample content by the user and the elapsed time indicated by the response, and
wherein parameters of the sample content include transmission speed and the transmission speed of the sample content is greater than a transmission threshold.

24. A non-transitory computer readable medium storing program code that when executed by a processor executes steps of providing data comprising:
providing sample content to a user device, the sample content being a portion of content data;
identifying a response to the sample content by a user of the user device;
providing second sample content to the user device based on the sample content;
wherein additional content data is provided to the user device when the response indicates a positive indication, that indicates that a user at the user device desires the additional content data,
wherein additional content is not provided to the user device when the response indicates a negative indication, that indicates that a user at the user device does not desire the additional content data,
wherein the response indicates:
an elapsed time that the sample content was provided prior to receiving the positive indication or the negative indication; and
updating a user profile data based on the response
wherein the sample content is provided to the user device based on a Content ranking, the ranking based on the response to the sample content by the user and the elapsed time indicated by the response, and
wherein parameters of the sample content include transmission speed and the transmission speed of the sample content is greater than a transmission threshold.

* * * * *